United States Patent
Koyama

(10) Patent No.: US 8,966,255 B2
(45) Date of Patent: Feb. 24, 2015

(54) COMMUNICATION APPARATUS AND COMMUNICATION SYSTEM

(75) Inventor: Toshiya Koyama, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 645 days.

(21) Appl. No.: 13/067,466

(22) Filed: Jun. 2, 2011

(65) Prior Publication Data

US 2011/0300791 A1 Dec. 8, 2011

(30) Foreign Application Priority Data

Jun. 3, 2010 (JP) ................................. 2010-128240

(51) Int. Cl.
| | |
|---|---|
| H04L 9/00 | (2006.01) |
| G08C 23/04 | (2006.01) |
| G08C 17/02 | (2006.01) |
| H04L 29/06 | (2006.01) |
| H04W 12/06 | (2009.01) |

(52) U.S. Cl.
CPC ................ *G08C 23/04* (2013.01); *G08C 17/02* (2013.01); *H04L 63/08* (2013.01); *H04W 12/06* (2013.01); *G08C 2201/93* (2013.01)
USPC ................................. 713/168; 713/169; 726/2

(58) Field of Classification Search
CPC ....... H04W 12/06; H04W 9/00; H04W 84/10; H04M 11/00
USPC .......................................................... 713/168
See application file for complete search history.

(56) References Cited

U.S. PATENT DOCUMENTS

| | | | |
|---|---|---|---|
| 2002/0147737 A1* | 10/2002 | Todokoro et al. | 707/200 |
| 2004/0067736 A1* | 4/2004 | Kamma | 455/41.2 |
| 2008/0180228 A1* | 7/2008 | Wakefield et al. | 340/310.11 |
| 2011/0207403 A1 | 8/2011 | Kim et al. | |

FOREIGN PATENT DOCUMENTS

| | | |
|---|---|---|
| JP | 2006-109094 | 4/2006 |
| JP | 2008-28463 | 2/2008 |
| JP | 2008-278170 | 11/2008 |
| JP | 2009-60163 | 3/2009 |
| WO | WO 2010/053241 A1 | 5/2010 |

OTHER PUBLICATIONS

Japanese Office Action mailed Nov. 26, 2013 in corresponding Japanese Application No. 2010-128240.
Japanese Office Action mailed Mar. 4, 2014 in corresponding Japanese Application No. 2010-128240.

* cited by examiner

*Primary Examiner* — Baotran N To
(74) *Attorney, Agent, or Firm* — Staas & Halsey LLP

(57) ABSTRACT

A communication apparatus including: a reception portion that receives identification information for a first apparatus to identify a second apparatus, and authentication information for the first apparatus to authenticate the second apparatus, from a network, the network being different from a route used when wireless communication between the first apparatus and the second apparatus is executed; and a communication unit that substitutes for the second apparatus and executes the wireless communication with the first apparatus by using the identification information and the authentication information when the second apparatus fails to execute the wireless communication with the first apparatus.

8 Claims, 11 Drawing Sheets

COMMUNICATION APPARATUS AND COMMUNICATION SYSTEM

CROSS-REFERENCE TO RELATED APPLICATION

This application is based upon and claims the benefit of priority of the prior Japanese Patent Application No. 2010-128240, filed on Jun. 3, 2010, the entire contents of which are incorporated herein by reference.

FIELD

A certain aspect of the embodiments discussed herein is related to a communication apparatus and a communication system.

BACKGROUND

Recently, short-range wireless communication such as Bluetooth or IrDA (Infrared Data Association) is generally used to control electric products. In the short-range wireless communication, only the communication between short distances can be done. Therefore, it is known that a terminal device executing the short-range wireless communication is connected to a device in a remote place by using a cell-phone (See Japanese Laid-Open Patent Publication No. 2008-278170).

There has been known a technique that a relay device obtains a BD_ADDR (Bluetooth Device Address) and a service code from each device executing Bluetooth communication and stores them, and a cell-phone inquires of the relay device an apparatus having a function that the cell-phone requires (See Japanese Laid-Open Patent Publication No. 2009-60163).

However, in a conventional communication system, a communication apparatus communicates with a device executing the short-range wireless communication at a short distance for example, and then the communication apparatus cannot communicate with the same device at a long distance. For example, the communication apparatus operates home electric appliances in a room by using the short-range wireless communication. Then, the communication apparatus cannot operate the home electric appliances away from home.

SUMMARY

According to an aspect of the present invention, there is provided a communication apparatus including: a reception portion that receives identification information for a first apparatus to identify a second apparatus, and authentication information for the first apparatus to authenticate the second apparatus, from a network, the network being different from a route used when wireless communication between the first apparatus and the second apparatus is executed; and a communication unit that substitutes for the second apparatus and executes the wireless communication with the first apparatus by using the identification information and the authentication information when the second apparatus fails to execute the wireless communication with the first apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will now be given, with reference to the accompanying drawings, of an embodiment of the present invention.

First Embodiment

Figure 1:
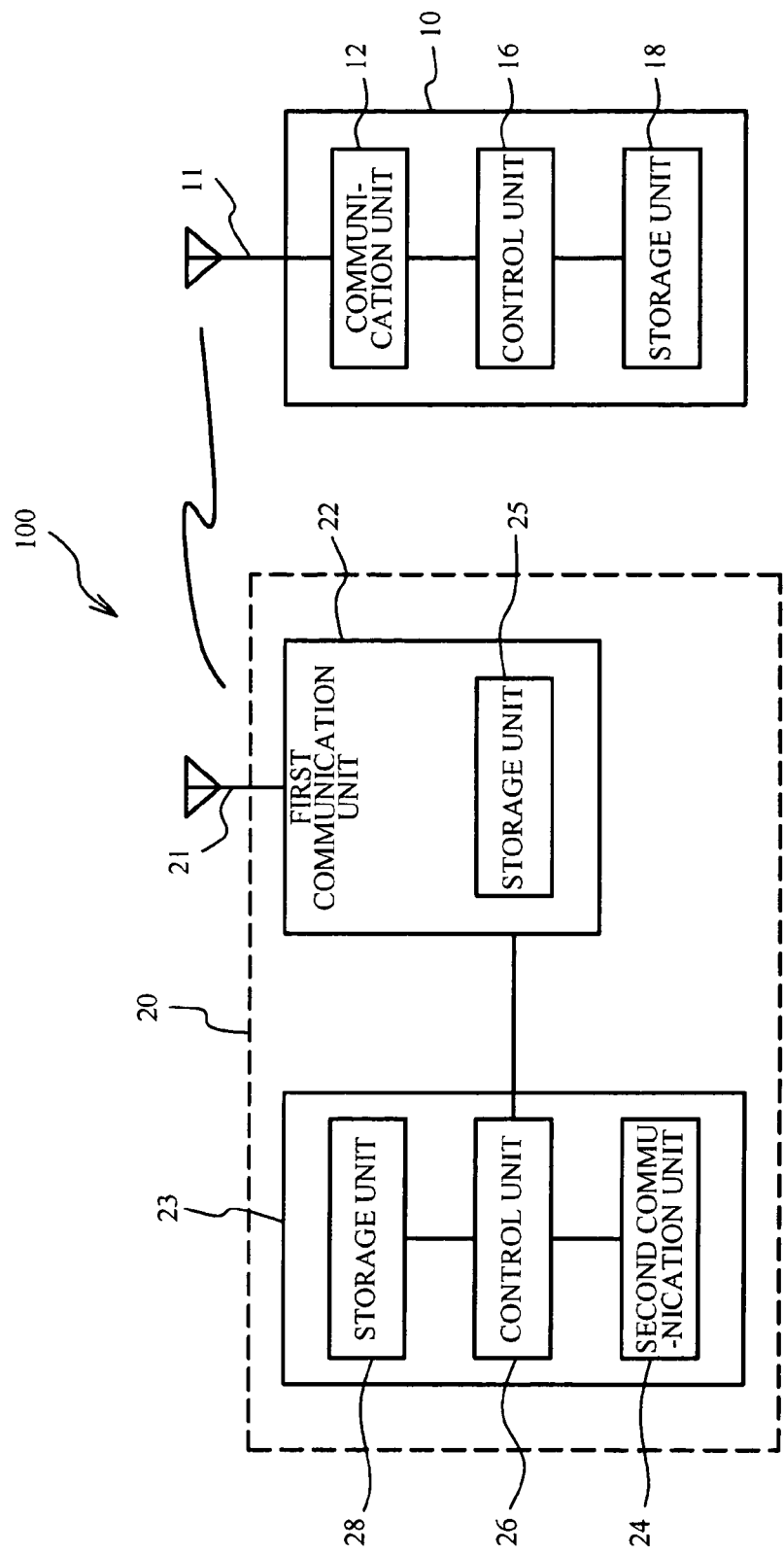
FIG. 1 is a block diagram illustrating the configuration of a communication system according to a first embodiment.

FIG. 1 is a block diagram illustrating the configuration of a communication system according to a first embodiment. FIG. 1 illustrates a case where a first apparatus 10 and a second apparatus 20 execute short-range wireless communication. The short-range wireless communication is communication using an electric wave such as Bluetooth, or communication using a light such as IrDA (Infrared Data Association). In the present embodiment, the wireless communication using the Bluetooth mainly is described as an example. A communication system 100 includes the first apparatus 10 and the second apparatus 20. The first apparatus 10 is an indoor apparatus, e.g. an apparatus provided in a home electric appliance. The second apparatus 20 is an apparatus for operating the first apparatus 10, e.g. a remote controller. The first apparatus 10 includes an antenna 11, a communication unit 12, a control unit 16, and a storage unit 18. The communication unit 12 is, for example, a wireless device for Bluetooth, and communicates with the second apparatus 20 via the antenna 11. The control unit 16 is, for example, a CPU (Central Processing Unit), and controls the communication unit 12. The control unit 16 further controls functions of the home electric appliance based on information from the second apparatus 20. The storage unit 18 is a volatile memory and a nonvolatile memory for example, and stores identification information and authentication information. The identification information is an address such as a BD_ADDR (Bluetooth Device Address) or a MAC (Media Access Control) address of the first apparatus 10, for example. The authentication information is security-related information for the first apparatus 10 to communicate with the second apparatus 20. For example, the authentication information is a key to encrypt data when the data is transmitted to the second apparatus 20, and a key to decrypt data received from the second apparatus 20.

The second apparatus 20 includes an antenna 21, a first communication unit 22, and a host device 23. The first communication unit 22 is a Bluetooth module that communicates with the first apparatus 10, for example. The first communication unit 22 includes a storage unit 25. The storage unit 25 stores identification information and authentication information. The identification information is an address such as a BD_ADDR (Bluetooth Device Address) or a MAC (Media Access Control) address of the second apparatus 20, for example. The authentication information is security-related information for the second apparatus 20 to communicate with the first apparatus 10. For example, the authentication information is a key to encrypt data when the data is transmitted to the first apparatus 10, and a key to decrypt data received from the first apparatus 10.

The host device 23 includes a second communication unit 24, a control unit 26, and a storage unit 28. The second communication unit 24 is a LAN (Local Area Network) interface connected with a network, for example. The control unit 26 is a CPU for example, and controls the first communication unit 22. Further, the control unit 26 controls second communication unit 24. The storage unit 28 is a volatile memory and a nonvolatile memory for example, and stores identification information and authentication information. The host device 23 is a computer for example, and may communicate with the first communication unit 22 that is a module, by using an interface such as a UART (Universal Asynchronous Receiver-Transceiver), a USB (Universal Serial Bus), a SDIO (Secure Digital Input/Output), or the like. The second apparatus 20 may be an apparatus in which the first communication unit 22 and the host device 23 are united with each other, e.g. a remote controller.

Figure 2:
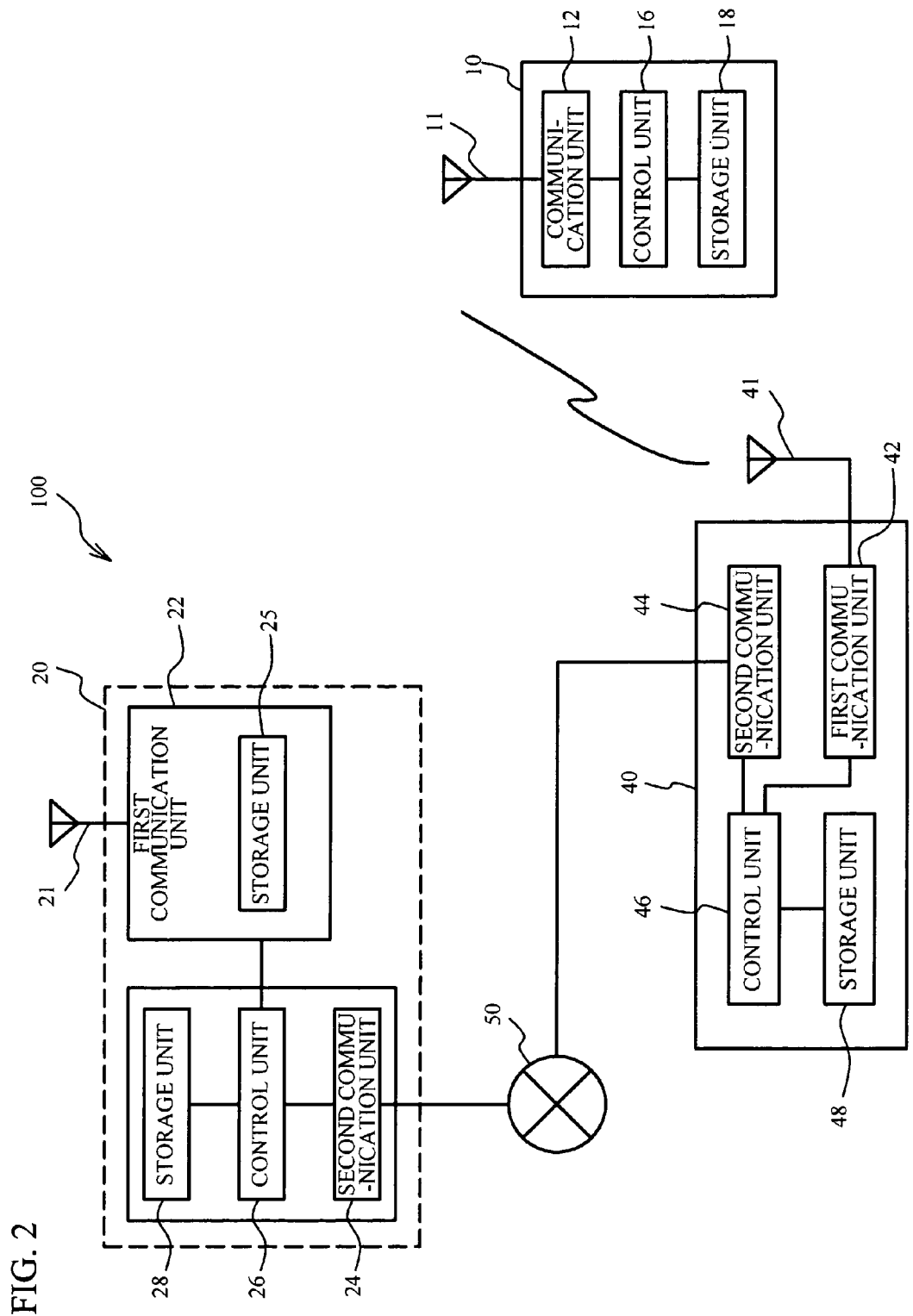
FIG. 2 is a block diagram illustrating another configuration of the communication system according to the first embodiment.

FIG. 2 is a block diagram illustrating another configuration of the communication system according to the first embodiment. FIG. 2 illustrates an example in which the second apparatus 20 transmits the identification information and the authentication information to a fourth apparatus 40 via a network 50, and the fourth apparatus 40 communicates with the first apparatus 10 as substitution of the second apparatus 20 when the second apparatus 20 cannot execute the short-range wireless communication with the first apparatus 10 directly. This corresponds to a case where the remote controller is taken out to the outdoors.

As illustrated in FIG. 2, the communication system 100 includes the fourth apparatus 40 in addition to the first apparatus 10 and the second apparatus 20. The fourth apparatus 40 is located, for example, in the same room as first apparatus 10. The fourth apparatus 40 includes an antenna 41, a first communication unit 42, a second communication unit 44, a control unit 46, and a storage unit 48. The first communication unit 42 is a wireless device for Bluetooth for example, and communicates with the first apparatus 10 via the antenna 41. The second communication unit 44 is, for example, a LAN interface connected with the network 50. The control unit 46 is a CPU for example, and controls the first communication unit 42 and the second communication unit 44. The storage unit 48 is a volatile memory and a nonvolatile memory for example. The storage unit 48 stores the identification information and the authentication information obtained from the second apparatus 20.

The second communication unit 24 of the second apparatus 20 can communicates with the second communication unit 44 of the fourth apparatus 40 via the network 50. The network 50 is a LAN (e.g. an Ethernet/LAN provided by IEEE 802.3), a wireless LAN (e.g. a wireless LAN provided by IEEE 802.11), or a network in which a cell-phone is used.

Figure 3:
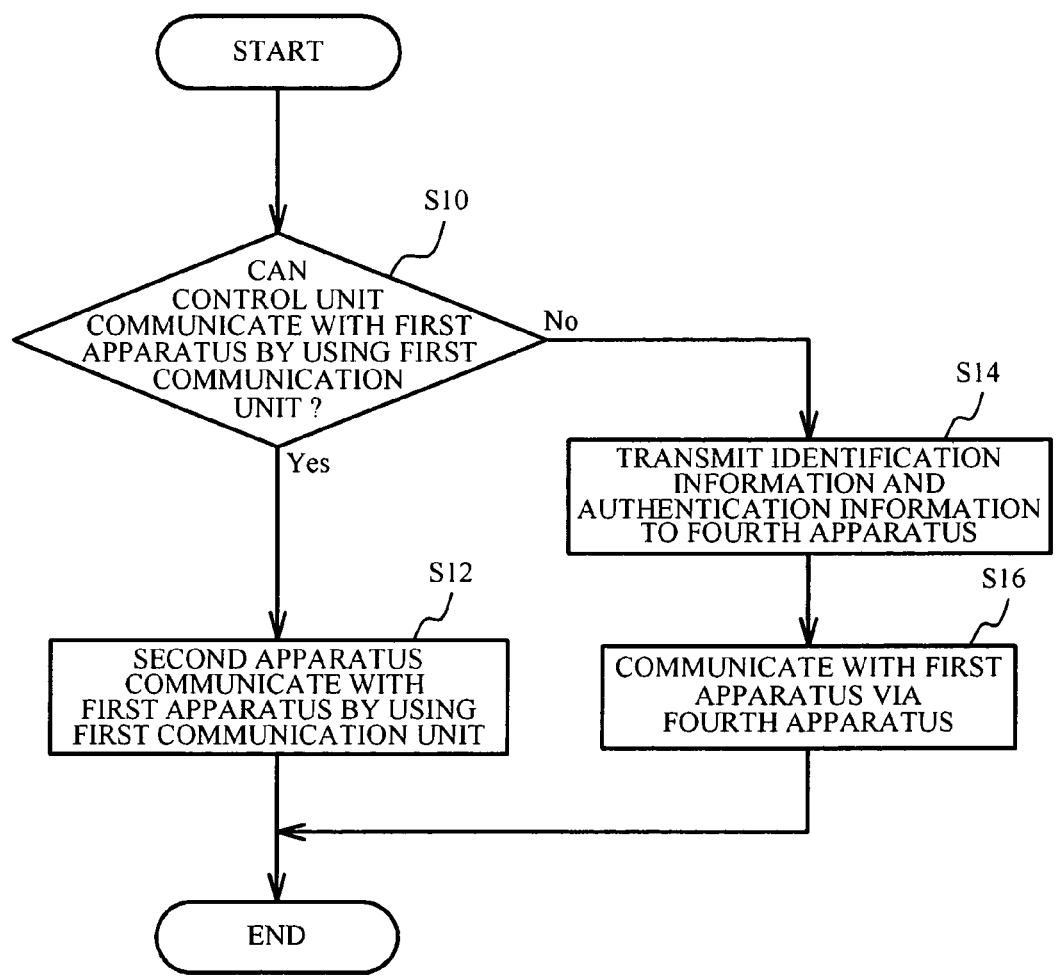
FIG. 3 is a flowchart illustrating the operation of a control unit in a second apparatus.

FIG. 3 is a flowchart illustrating the operation of the control unit 26 in the second apparatus 20. As illustrated in FIG. 3, the control unit 26 judges whether the control unit 26 can communicate with the first apparatus 10 by using the first communication unit 22 (step S10). When the answer to the judgment of step S10 is "Yes", the control unit 26 causes the second apparatus 20 to communicate with the first apparatus 10 by using the first communication unit 22 (step S12). When the answer to the judgment of step S10 is "No", the control unit 26 transmits the identification information and the authentication information to the fourth apparatus 40 (step S14). The control unit 26 causes the second apparatus 20 to communicate with the first apparatus 10 via the fourth apparatus 40 (step S16). Thus, when the second apparatus 20 cannot execute the short-range wireless communication, the second apparatus 20 communicates with the first apparatus 10 via the network 50 and the fourth apparatus 40 on behalf of the short-range wireless communication.

Figure 4:
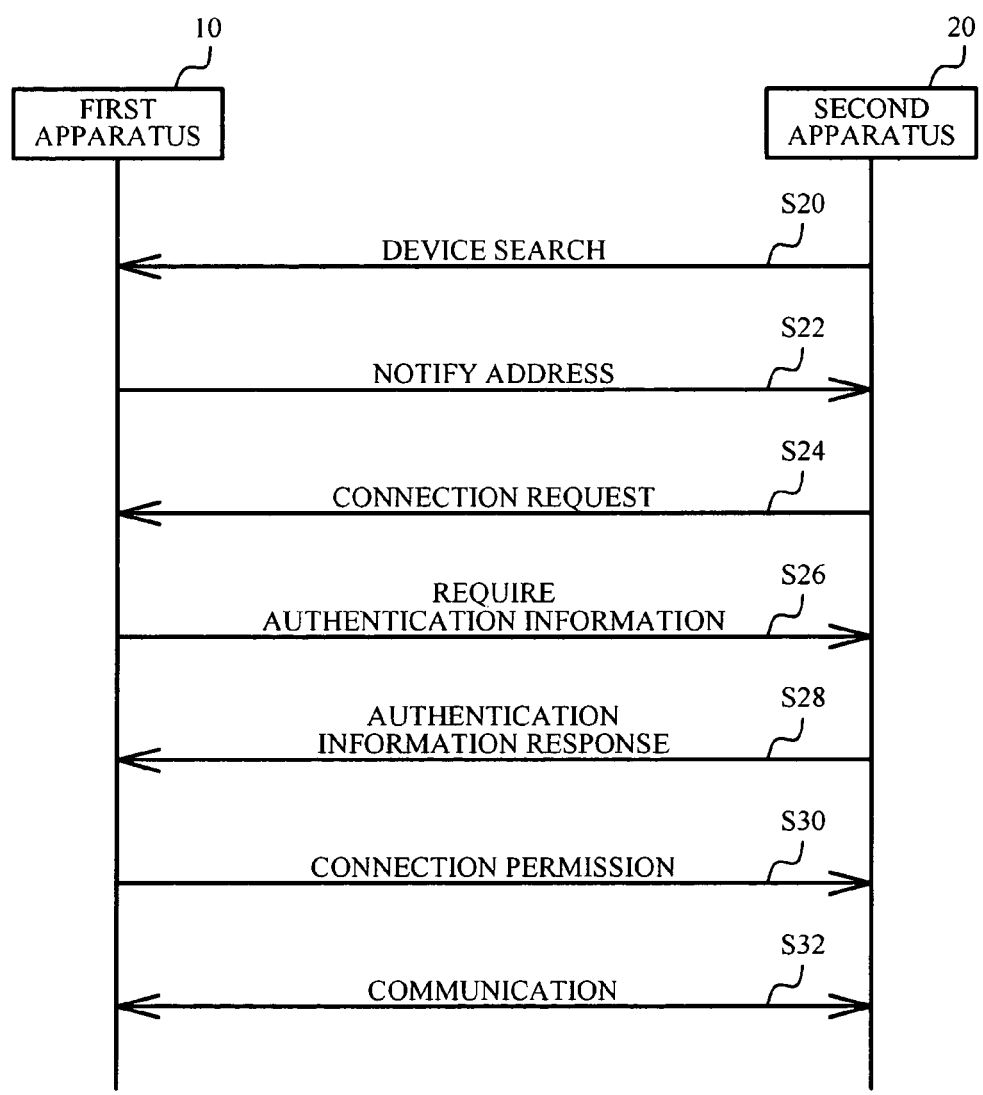
FIG. 4 is a sequence diagram illustrating the operation of a first apparatus and the second apparatus.

FIG. 4 is a sequence diagram illustrating the operation of the first apparatus 10 and the second apparatus 20. FIG. 4 is a sequence diagram when the answer to the judgment of step S10 in FIG. 3 is "Yes". The second apparatus 20 executes device search (step S20). The first apparatus 10 notifies the second apparatus 20 of the address (e.g. BD_ADDR) of the first apparatus 10 as a response of the device search (step S22). The second apparatus 20 outputs a connection request to the first apparatus 10 (step S24). The first apparatus 10 requires the authentication information to the second apparatus 20 (step S26). The second apparatus 20 transmits an authentication information response encrypted by a key that is the authentication information, to the first apparatus 10 (step S28). When the authentication information is valid, the first apparatus 10 permits the connection with the first apparatus 10 to the second apparatus 20 (step S30). Thus, the authentication between the first apparatus 10 and the second apparatus 20 is executed. Then, the first apparatus 10 and the second apparatus 20 communicate with each other (step S32).

Figure 5:
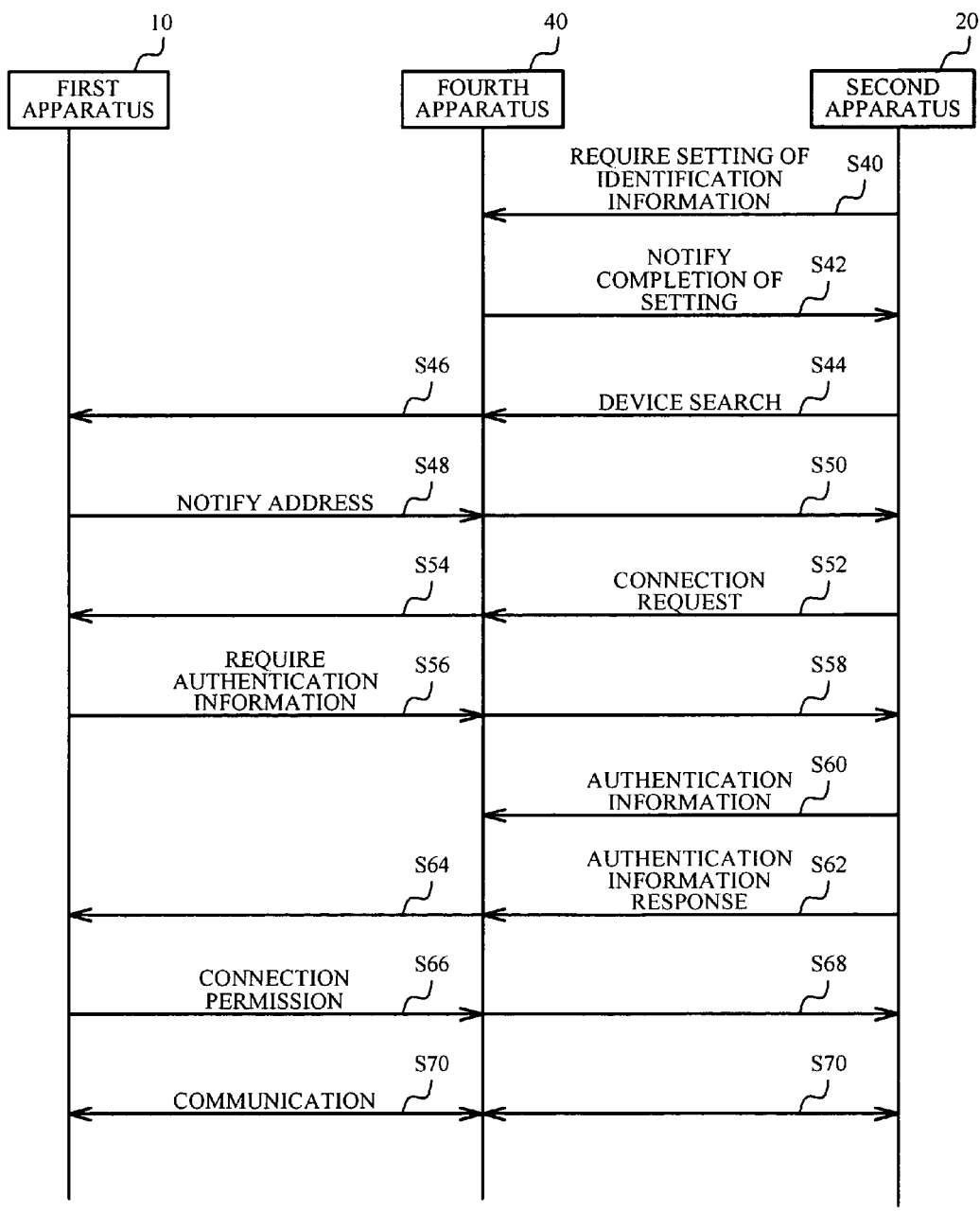
FIG. 5 is a sequence diagram illustrating the operation of the first apparatus, the second apparatus and a fourth apparatus.

FIG. 5 is a sequence diagram illustrating the operation of the first apparatus 10, the second apparatus 20 and the fourth apparatus 40. FIG. 5 is a sequence diagram when the answer to the judgment of step S10 in FIG. 3 is "No". The host device 23 of the second apparatus 20 obtains the identification information of the second apparatus 20 from the storage unit 25 of the first apparatus 10. The control unit 26 of the second apparatus 20 requires setting of the identification information to the fourth apparatus 40 via the network 50 (step S40). For example, the second apparatus 20 transmits the BD_ADDR, the MAC address or the like of the second apparatus 20 as the identification information to the fourth apparatus 40. The control unit 46 of the fourth apparatus 40 stores the identification information of the second apparatus 20 into the storage unit 48, as identification information of the fourth apparatus 40. The fourth apparatus 40 notifies the second apparatus 20 of the completion of setting of the identification information (step S42).

The second apparatus 20 instructs the device search to the fourth apparatus 40 via the network 50 (step S44). The fourth apparatus 40 executes the device search by using the identification information of the second apparatus 20 (step S46). It seems to the first apparatus 10 that the second apparatus 20 has executed the device search. Therefore, the first apparatus 10 notifies the fourth apparatus 40 of the address of the first apparatus 10 (step S48). The fourth apparatus 40 notifies the second apparatus 20 of the address of the first apparatus 10 via the network 50 (step S50). The second apparatus 20 instructs a connection request to the first apparatus 10 via the network 50 (step S52). The fourth apparatus 40 transmits connection request to the first apparatus 10 on behalf of the second apparatus 20 (step S54).

The first apparatus 10 requires the authentication information to the fourth apparatus 40 which is substitution of the second apparatus 20 (step S56). The fourth apparatus 40 requires the authentication information to the second apparatus 20 via the network 50 (step S58). The second apparatus 20 transmits the authentication information to the fourth apparatus 40 (step S60). The authentication information is a key to encrypt data to be transmitted to the first apparatus 10, and a key to decrypt data received from the first apparatus 10. The second apparatus 20 transmits an authentication information response to the fourth apparatus 40 (step S62). The fourth apparatus 40 encrypts the authentication information response by using the key which is the authentication information, and transmits the encrypted authentication information response to the first apparatus 10 (step S64). When the first apparatus 10 judges that the encrypted authentication information response from the fourth apparatus 40 is valid, the first apparatus 10 notifies the fourth apparatus 40 of connection permission of the second apparatus 20 (step S66). The fourth apparatus 40 notifies the second apparatus 20 of the connection permission (step S68). Then, the first apparatus 10 and the second apparatus 20 communicate with each other (step S70).

According to the first embodiment, when the second apparatus 20 cannot execute the wireless communication with the first apparatus 10 by using the first communication unit 22 (when the answer to the judgment of step S10 in FIG. 3 is "Yes"), the second apparatus 20 transmits the identification information for the first apparatus 10 to identify the second apparatus 20, and the authentication information for the first apparatus 10 to authenticate the second apparatus 20, to the fourth apparatus 40 via the network 50 different from a route used when the wireless communication is executed (step S14 in FIG. 3, and steps S40 and S60 in FIG. 5). When the second apparatus 20 cannot directly execute the wireless communication with the first apparatus 10, the fourth apparatus 40 substitutes for the second apparatus 20 and executes the wireless communication with the first apparatus 10 by using the identification information and the authentication information received from the second apparatus 20 (step S16 in FIG. 3 and step S70 in FIG. 5). Thereby, the second apparatus 20 can communicate with the first apparatus 10 via the fourth apparatus 40 at long range.

Since the second apparatus 20 operates as described above, the second apparatus 20 (communication apparatus) includes: the first communication unit 22 that executes the wireless communication with the first apparatus 10; and the second communication unit 24 that, when the first communication unit 22 cannot execute the wireless communication with the first apparatus 10 directly, transmits the identification information and the authentication information to the fourth apparatus 40 via the network 50 different from the route used when the wireless communication is executed, and communicates with the first apparatus 10 via the fourth apparatus 40.

The fourth apparatus 40 (communication apparatus) includes: the second communication unit 44 (a reception portion) that receives the identification information and the authentication information from the second apparatus 20 via the network 50 different from the route used when the wireless communication is executed; and the first communication unit 42 (a communication portion) that substitutes for the second apparatus 20 and executes the wireless communication with the first apparatus 10 by using the identification information and the authentication information when the second apparatus 20 cannot execute the wireless communication with the first apparatus 10 directly.

For example, the second communication unit 44 can receive the identification information and the authentication information from the second apparatus 20 via the network 50. Thereby, the fourth apparatus 40 can easily obtain the identification information and the authentication information from the second apparatus 20.

Second Embodiment

Figure 6:
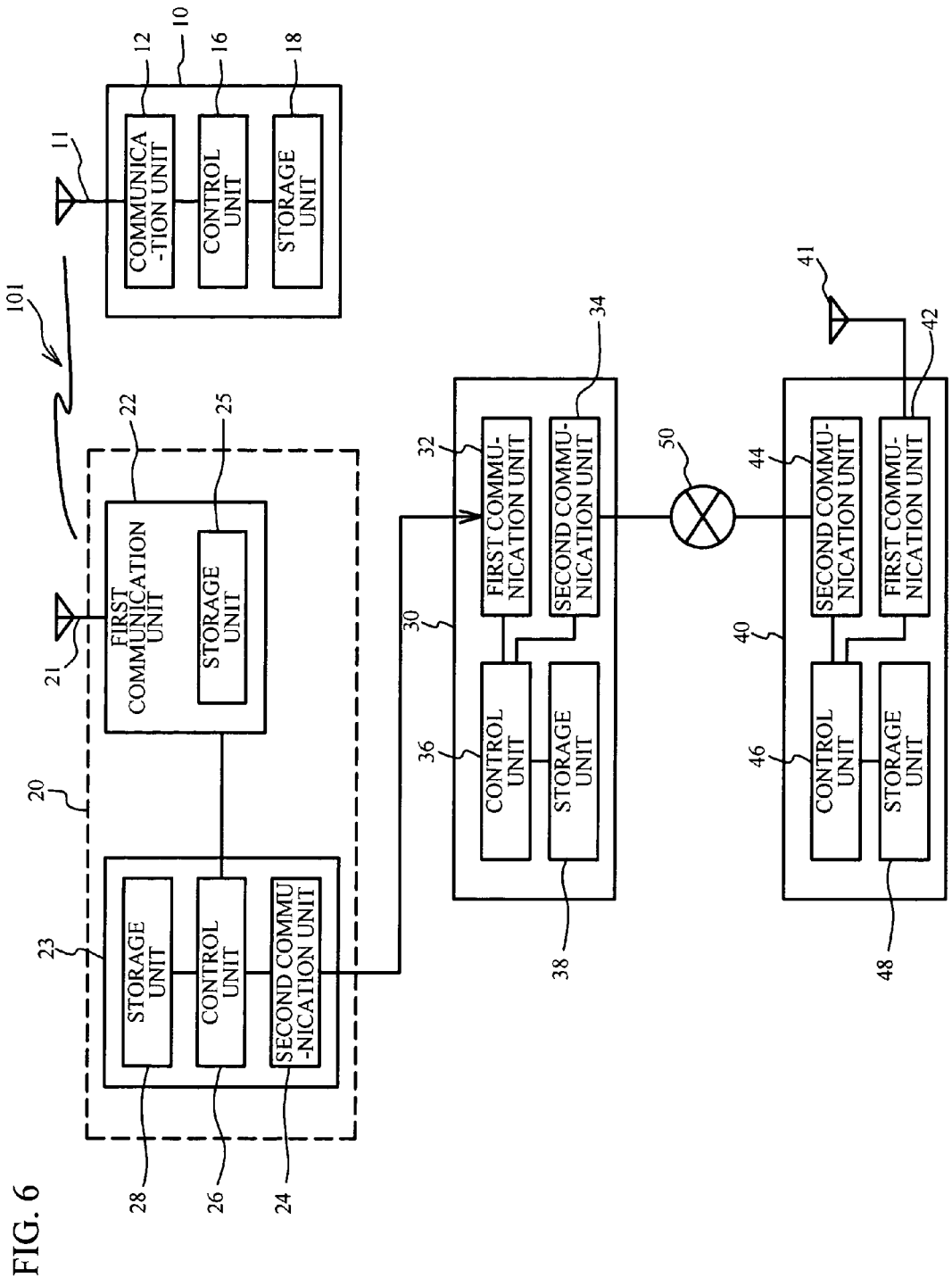
FIG. 6 is a block diagram illustrating the configuration of a communication system according to a second embodiment.

The second embodiment is an example in which a communication system includes a third apparatus. FIG. 6 is a block diagram illustrating the configuration of the communication system according to the second embodiment. As illustrated in FIG. 6, a communication system 101 includes a third apparatus 30 in addition to the first apparatus 10, the second apparatus 20, and the fourth apparatus 40. Since the configuration of the first apparatus 10 and the second apparatus 20 is the same as that of the first apparatus 10 and the second apparatus 20 in the first embodiment, a description thereof will be omitted. The third apparatus 30 includes an antenna 31, a first communication unit 32, a second communication unit 34, a control unit 36, and a storage unit 38. The first communication unit 32 receives the identification information and the authentication information from the second apparatus 20. The first communication unit 32 directly obtains the identification information and the authentication information by using a LAN, a wireless LAN, a network in which a cell-phone is used, a USB memory, a SD (Secure Digital) card, or the like. The second communication unit 34 is a LAN interface connected to a network, for example. The control unit 36 is a CPU for example, and controls the first communication unit 32 and the second communication unit 34. The storage unit 38 is a volatile memory and a nonvolatile memory for example. The storage unit 38 stores the identification information and the authentication information obtained from the second apparatus 20. For example, the third apparatus 30 is a cell-phone to carry outdoors.

Figure 7:
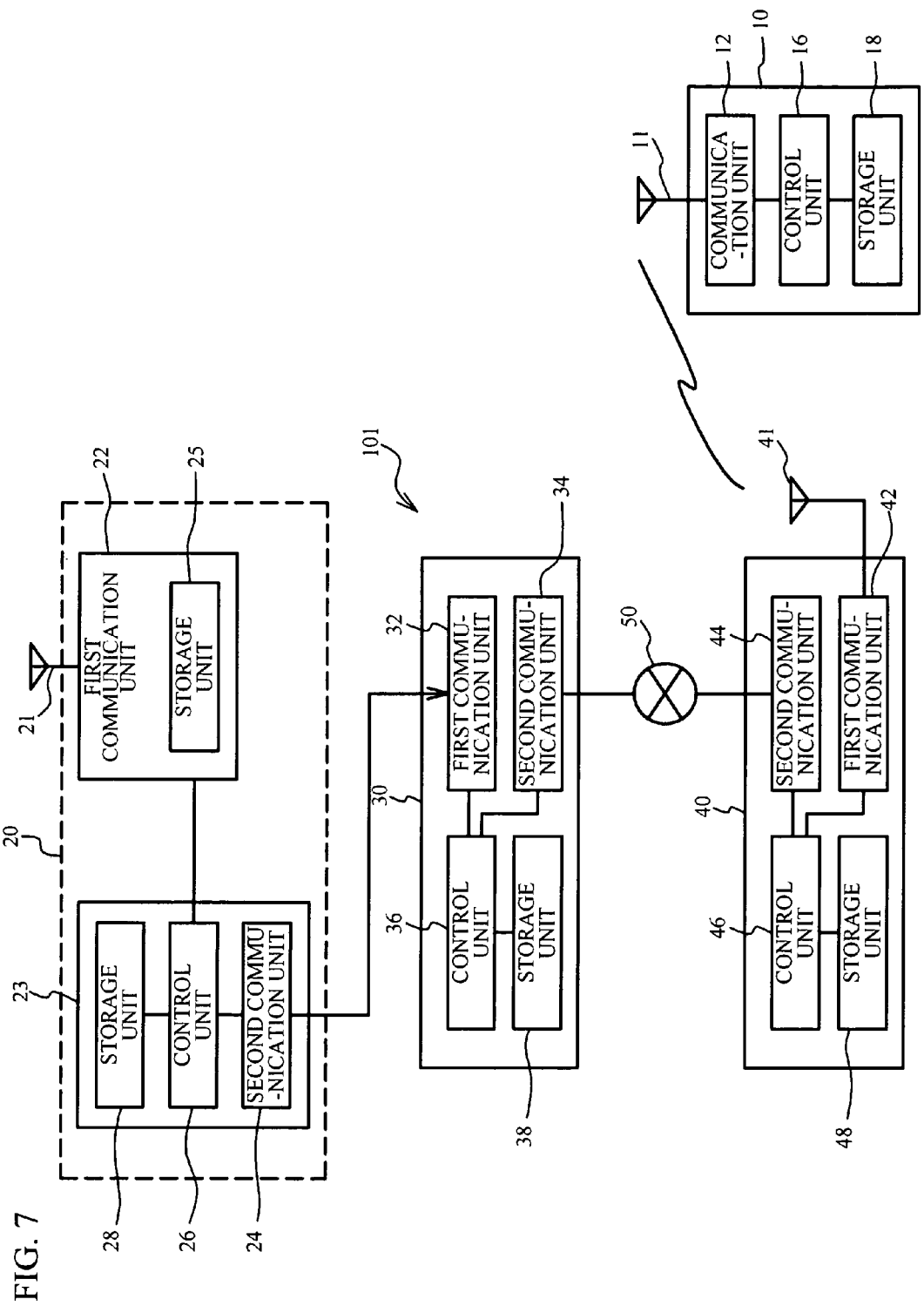
FIG. 7 is a block diagram illustrating another configuration of the communication system according to the second embodiment.

FIG. 7 is a block diagram illustrating another configuration of the communication system according to the second embodiment. FIG. 7 illustrates an example in which the third apparatus 30 transmits the identification information and the authentication information to a fourth apparatus 40 via the network 50, and the fourth apparatus 40 communicates with the first apparatus 10 as substitution of the second apparatus 20 when the second apparatus 20 cannot execute the short-range wireless communication with the first apparatus 10 directly. For example, this corresponds to a case where the third apparatus 30 as the cell-phone communicates with the first apparatus 10 from the outdoors.

As illustrated in FIG. 7, the first apparatus 10, the fourth apparatus 40, and the network 50 are the same as those of the first embodiment, the second apparatus 20 and the third apparatus 30 are the same as those of FIG. 6. Therefore, the description of the first apparatus 10, the second apparatus 20, the third apparatus 30, the fourth apparatus 40, and the network 50 will be omitted. The second communication unit 34 of the third apparatus 30 is connected to the second communication unit 44 of the fourth apparatus 40 via the network 50.

Figure 8:
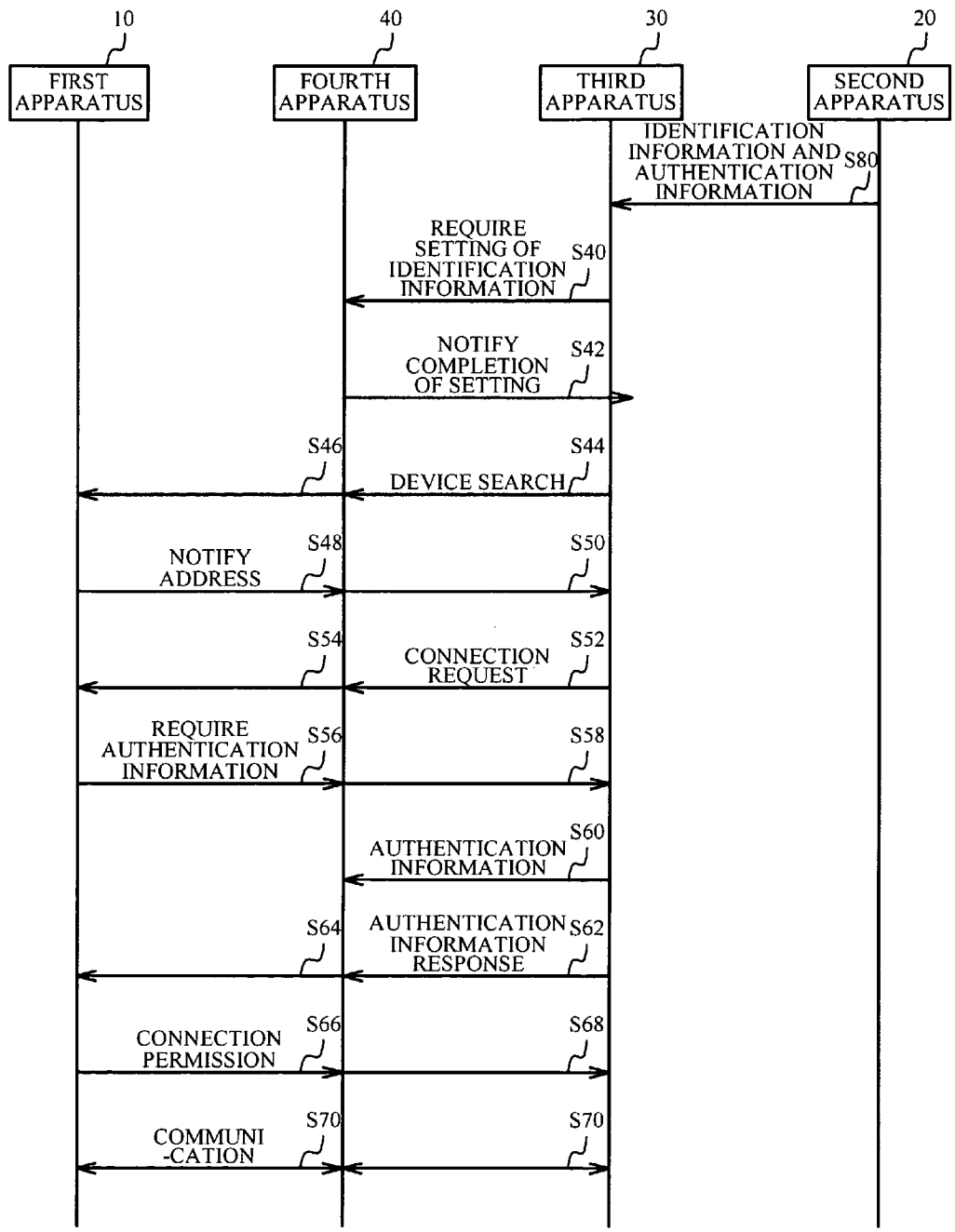
FIG. 8 is a sequence diagram illustrating the operation of the first apparatus, the second apparatus, a third apparatus and the fourth apparatus.

FIG. 8 is a sequence diagram illustrating the operation of the first apparatus, the second apparatus, the third apparatus and the fourth apparatus. The third apparatus 30 obtains the identification information and the authentication information from the second apparatus 20 (step S80). For example, when the user goes out, the identification information and the authentication information are transmitted from the second apparatus 20 which is the remote controller to the third apparatus 30 which is the cell-phone. Steps S40 to S70 of FIG. 8 are the same as those of FIG. 5, except that the second apparatus 20 of FIG. 5 in the first embodiment is replaced with the third apparatus 30. Therefore, a description of steps S40 to S70 of FIG. 8 will be omitted.

According to the second embodiment, the second apparatus 20 transmits the identification information for the first apparatus 10 to identify the second apparatus 20, and the authentication information for the first apparatus 10 to authenticate the second apparatus 20, to the third apparatus 30 as described in step S80 of FIG. 8. The third apparatus 30 transmits the identification information and the authentication information received from the second apparatus 20, to the fourth apparatus 40 as described in steps S40 and S60 of FIG. 8. The fourth apparatus 40 substitutes for the third apparatus 30 and executes the wireless communication with the first apparatus 10 by using the identification information and the authentication information received from the third apparatus 30 as described in step S70 of FIG. 8. As described in the second apparatus 20, the second apparatus 20 that executes the short-range wireless communication with the first apparatus 10 and the third apparatus 30 that communicates with the first apparatus 10 from a remote place may be configured separately. Thereby, the fourth apparatus 40 can easily obtain the identification information and the authentication information not from the second apparatus 20 but from the third apparatus 30.

Since the third apparatus 30 operates as described above, the third apparatus 30 (communication apparatus) includes: the first communication unit 32 (reception portion) that receives the identification information and the authentication information; and the second communication unit 34 (communication portion) that communicates with the first apparatus 10 via the fourth apparatus 40 by using the identification information and the authentication information when the second apparatus 20 cannot execute the wireless communication with the first apparatus 10 directly.

In the first and the second embodiments, a link key method in which the first apparatus 10 and the second apparatus 20 have the key for encryption and decryption as the authentication information is explained. The authentication information may be a PIN (Personal Identification Number) cord in a PIN code system to generate a key with the PIN cord at the time of an initial connection.

Third Embodiment

Figure 9:
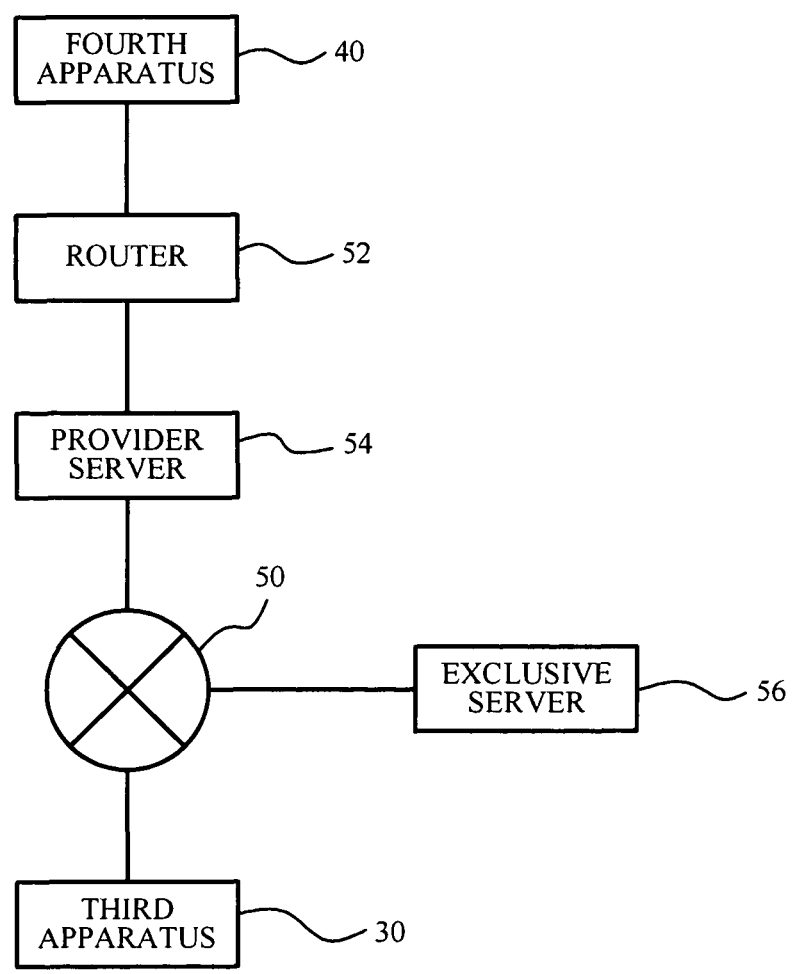
FIG. 9 is a block diagram illustrating the configuration of a communication system according to a third embodiment.

A third embodiment is an example in which the second apparatus 20 and the third apparatus 30 are connected to the fourth apparatus 40 via an interne. FIG. 9 is a block diagram illustrating the configuration of a communication system according to the third embodiment. The fourth apparatus 40 is connected to the third apparatus 30 via a router 52, a provider server 54, and the network 50. It should be noted that the third apparatus 30 may be replaced with the second apparatus 20. An exclusive server 56 is connected to the network 50.

Figure 10:
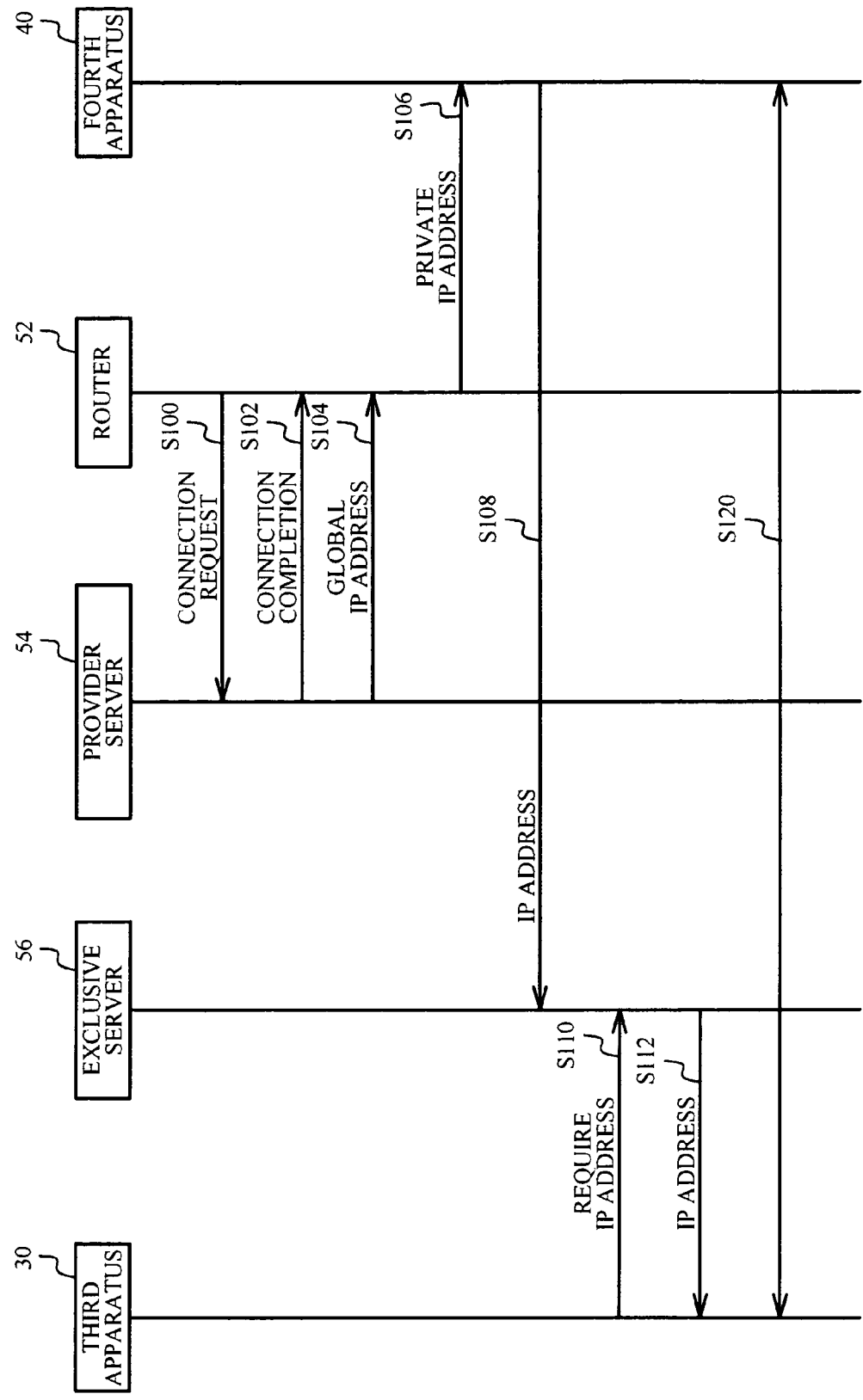
FIG. 10 is a sequence diagram illustrating the communication system according to the third embodiment.

FIG. 10 is a sequence diagram illustrating the communication system according to the third embodiment. The router 52 transmits a connection request to the provider server 54 (step S100). The provider server 54 notifies the router 52 of connection completion (step S102). The provider server 54 assigns a global IP (Internet Protocol) address to the router 52 (step S104). The router 52 assigns a private IP address to the fourth apparatus 40 (step S106). The fourth apparatus 40 causes the exclusive server 56 to store the IP address of the fourth apparatus 40 (step S108). The third apparatus 30 requires the IP address of the fourth apparatus 40 to the exclusive server 56 (step S110). The exclusive server 56 transmits the IP address of the fourth apparatus 40 stored into the exclusive server 56, to the third apparatus 30 (step S112). Thereby, the third apparatus 30 can recognize the IP address of the fourth apparatus 40, and hence the identification information and the authentication information can be transmitted and received between the third apparatus 30 and the fourth apparatus 40 (step S120).

Figure 11:
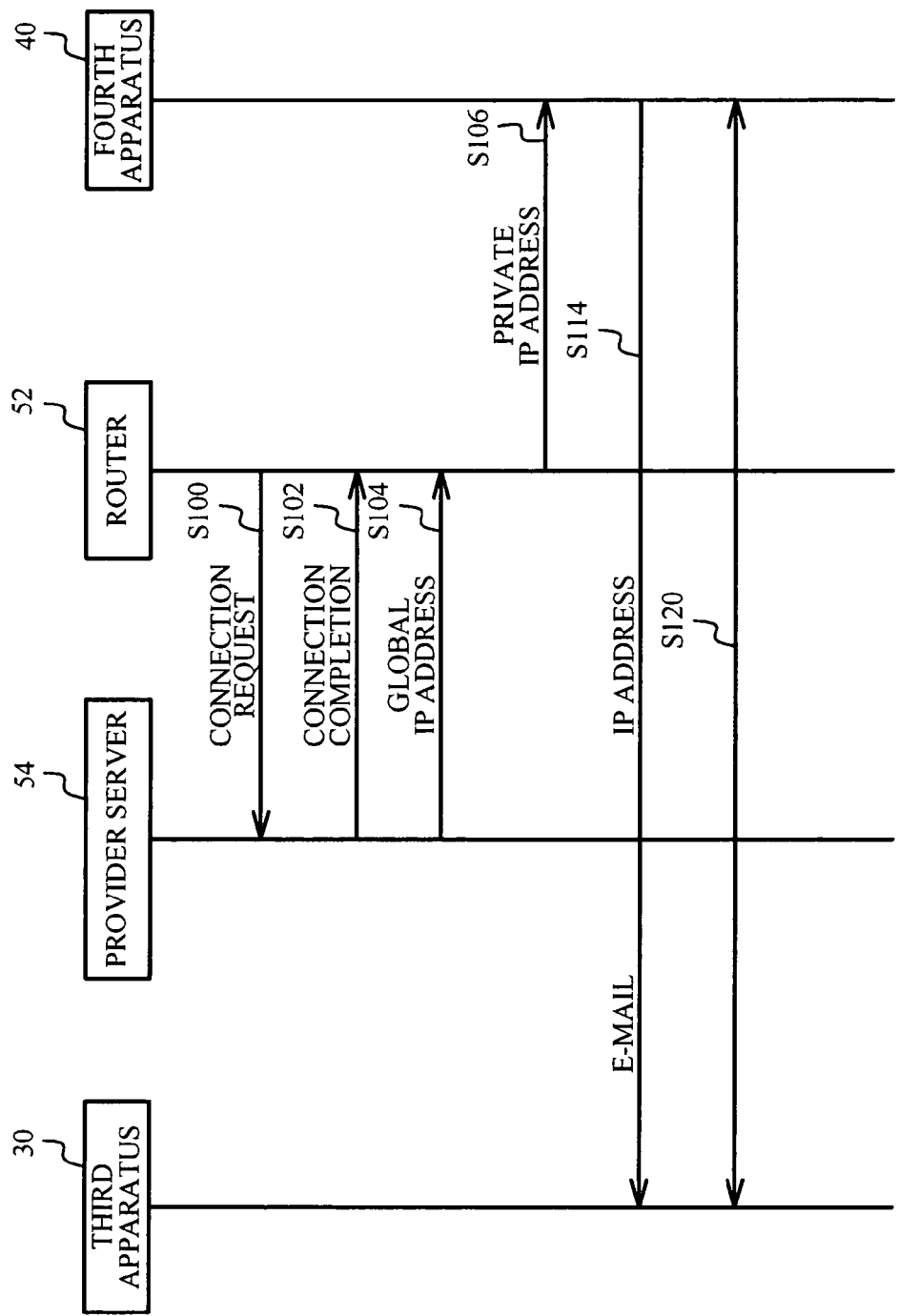
FIG. 11 is another sequence diagram illustrating the communication system according to the third embodiment.

FIG. 11 is another sequence diagram illustrating the communication system according to the third embodiment. In this example, the exclusive server is not used as illustrated in FIG. 11. Steps 100 to S106 of FIG. 11 are the same as those of FIG. 10, and hence a description of steps 100 to S106 of FIG. 11 will be omitted. The fourth apparatus 40 transmits the IP address of the fourth apparatus 40 to the third apparatus 30 by an e-mail (step S114). Thereby, the third apparatus 30 can recognize the IP address of the fourth apparatus 40, and hence the identification information and the authentication information can be transmitted and received between the third apparatus 30 and the fourth apparatus 40 (step S120).

When the second apparatus 20 or the third apparatus 30 is connected to the fourth apparatus 40 by the interne for example, there is a case where the IP address of the fourth apparatus 40 is different for each connection. In this case, the second apparatus 20 or the third apparatus 30 cannot access the fourth apparatus 40. Consequently, the second communication unit 44 of the fourth apparatus 40 transmits a network address (i.e., IP address) of the fourth apparatus 40 to the second apparatus 20 or the third apparatus 30 by using another route (e.g. the exclusive server or the e-mail), as described in the third embodiment. Thereby, even when the IP address of the fourth apparatus 40 is different for each connection, the second apparatus 20 or the third apparatus 30 can recognize the IP address of the fourth apparatus 40.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A communication apparatus, communicating with a plurality of communication apparatuses, configured to execute wireless communication, the communication apparatus comprising:

a network communication unit, including an interface, that receives, from a second communication apparatus that communicates with a first communication apparatus by wireless communication, identification information for identifying the second communication apparatus, and authentication information for authenticating the second communication apparatus, through a network, the network being different from a route for executing wireless communication and the network communication unit transmits a network address of the communication apparatus to the second communication apparatus by using an exclusive server connected to the network or an e-mail; and a wireless device unit that executes wireless communication with the first communication apparatus in substitution for the second communication apparatus by using the identification information and the authentication information that the network communication unit has received when the second communication apparatus is unable to execute the wireless communication with the first communication apparatus.

2. The communication apparatus according to claim 1, the network communication unit receives the identification information and the authentication information from the second communication apparatus via the network.

3. The communication apparatus according to claim 1, the network communication unit receives the identification information and the authentication information from a third communication apparatus via the network, the third communication apparatus having obtained the identification information and the authentication information from the second communication apparatus.

4. The communication apparatus according to claim 3, the network communication unit transmits a network address of the communication apparatus to the third communication apparatus by using a route different from the network.

5. A communication apparatus, communicating with a first communication apparatus and a fourth communication apparatus, the communication apparatus comprising:
a wireless device unit that executes direct wireless communication with the first communication apparatus; and
a network communication unit that, when the wireless device unit is unable to execute the direct wireless communication with the first communication apparatus, transmits identification information for identifying the communication apparatus and authentication information for authenticating the communication apparatus to the fourth communication apparatus through a network, communicates with the first communication apparatus via the fourth communication apparatus, the network being different from a route used for executing the wireless communication, and the network communication unit receives a network address of the fourth communication apparatus from the fourth communication apparatus by using an exclusive server connected to the network or an e-mail.

6. A communication apparatus, communicating with a first communication apparatus and a second communication apparatus, the communication apparatus comprising:
a wireless device unit that receives, from the second communication apparatus that communicates with the first communication apparatus in wireless communication, identification information for identifying the second communication apparatus, and authentication information for authenticating the second communication apparatus through a network different from a route for executing wireless communication; and
a network communication unit that, when the second communication apparatus is unable to directly communicate with the first communication apparatus in wireless communication, communicates with the first communication apparatus via a network different from a route for executing wireless communication and a fourth communication apparatus that is communicates with the first communication apparatus in wireless communication by using the identification information and the authentication information that the second communication unit has received, and the network communication unit receives a network address of the fourth communication apparatus from the fourth communication apparatus by using an exclusive server connected to the network or an e-mail.

7. A communication system, comprising:
a first communication apparatus;
a second communication apparatus that executes wireless communication with the first communication apparatus;
a fourth communication apparatus that communicates with the second communication apparatus through a network different from a route used for executing wireless communication;
wherein the second communication apparatus, when the second communication apparatus fails to execute direct wireless communication with the first communication apparatus, transmits identification information for identifying the second communication apparatus, and authentication information for authenticating the second communication apparatus to the fourth communication apparatus through the network, and
wherein the fourth communication apparatus transmits a network address of the fourth communication apparatus to the second communication apparatus by using an exclusive server connected to the network or an e-mail and executes the wireless communication with the first communication apparatus in substitution for the second communication apparatus by using the identification information and the authentication information received from the second communication apparatus.

8. A communication system, comprising:
a first communication apparatus;
a second communication apparatus that, executes wireless communication with the first communication apparatus;
a third communication apparatus that communicates with the second communication apparatus through a network different from a route for executing wireless communication; and
a fourth communication apparatus that communicates with the third communication apparatus and executes wireless communication;
wherein the second communication apparatus, when the second communication apparatus fails to execute wireless communication with the first communication apparatus, transmits identification information for identifying the second communication apparatus, and authentication information for authenticating the second communication apparatus to the third communication apparatus through the network,
wherein the third communication apparatus transmits the identification information and the authentication information received from the second communication apparatus to the fourth communication apparatus; and
wherein the fourth communication apparatus transmits a network address of the fourth communication apparatus to the third communication apparatus by using an exclusive server connected to the network or an e-mail and executes the wireless communication with the first communication apparatus in substitution for the third communication apparatus by using the identification information and the authentication information received from the third communication apparatus.

\* \* \* \* \*